United States Patent [19]
Fujishima

[11] Patent Number: 6,099,034
[45] Date of Patent: Aug. 8, 2000

[54] OUTRIGGER JACK

[75] Inventor: Seiji Fujishima, Ageo, Japan

[73] Assignee: Kabushika Kaisha, Aichi, Japan

[21] Appl. No.: 09/397,785

[22] Filed: Sep. 16, 1999

[30]     Foreign Application Priority Data

Dec. 11, 1998  [JP]  Japan .................................. 10-352969

[51] Int. Cl.[7] .................................................. B60S 9/02
[52] U.S. Cl. ..................................... 280/766.1; 280/763.1
[58] Field of Search ........................... 280/766.1, 764.1, 280/763.1, 765.1; 254/418, 419, 423

[56]            References Cited

U.S. PATENT DOCUMENTS

| | | | |
|---|---|---|---|
| 3,438,509 | 4/1969 | Munn | 280/766.1 |
| 4,402,526 | 9/1983 | Huetsch | 280/766.1 |
| 5,267,749 | 12/1993 | Hughes | 280/766.1 |
| 5,409,251 | 4/1995 | Thorndyke | 280/766.1 |
| 5,901,980 | 5/1999 | Few et al. | 280/766.1 |

*Primary Examiner*—Richard M. Camby
*Attorney, Agent, or Firm*—Klauber & Jackson

[57]            ABSTRACT

An outrigger jack 10 comprises an outer post 11, an inner post 12, which is inserted and axially movable in the outer post, and an extension cylinder 15, which is provided inside the outer and inner posts 11 and 12 to move the inner post 12 with respect to the outer post 11 so as to extend or contract the outrigger jack. The outrigger jack 10 further comprises a ground plate 25, which is provided pivotally at the lower end of the inner post 12 through a coupling mechanism 20. This coupling mechanism 20 comprises a U-shaped member 21, which is fixed on the lower end of the inner post 12, and an inverted U-shaped member 23, which is engaged with the U-shaped member 21 and fixed on the ground plate 25. The lower end of the cylinder rod 17 which is exposed out of the lower end of the inner post 12 is formed in such a way as to engage with the inner post 12 as well as to meet the inverted U-shaped member 23.

8 Claims, 6 Drawing Sheets

OUTRIGGER JACK

FIELD OF THE INVENTION

The present invention generally relates to an outrigger jack which comprises telescopically arranged outer and inner posts and an extension cylinder provided inside these posts for expansion and contraction. Furthermore, the present invention relates more particularly to an outrigger jack which includes a pad provided pivotally at an end of the inner post.

BACKGROUND OF THE INVENTION

The above mentioned type of outrigger jack has been used to securely support the vehicle body of a maintenance vehicle such as an aerial work platform machine or a crane truck, while the vehicle is used for performing some work. Japanese Utility-Model Publication No. H6(1994)-24290 discloses an example of such prior-art outrigger jack, which is shown in FIG. 8. This outrigger jack 50 comprises an outer post 51, which is fixed to the frame of a vehicle (or to an outrigger beam), an inner post 52, which is telescopically inserted into the outer post 51 and extensible downwardly, an extension cylinder 55, which is provided inside these posts 51 and 52, and a ground plate 60, which is mounted pivotally on the lower face plate 53 of the inner post 52. The extension cylinder 55 comprises a cylinder tube 56 and a cylinder rod 57, which is fitted in the cylinder tube, and the cylinder rod 57 is actuated by the hydraulic pressure supplied into the cylinder tube 56 for the extension and contraction of the extension cylinder.

The cylinder tube 56 is connected pivotally to the outer post 51 while the lower end 57a of the cylinder rod 57 is connected pivotally to the lower face plate 53 of the inner post 52 with a pivot pin 54. Thus, the inner post 52 is extensible downward with respect to the outer post 51 by the actuation of the extension cylinder 55. On the lower side of the lower face plate 53 of the inner post 52, a U-shaped member 58 is welded. This U-shaped member is engaged with an inverted U-shaped member 59, which is welded to the upper face of the ground plate 60 as shown in the drawing. In this construction, the ground plate 60 is connected pivotally to the inner post 52, so it swings freely. In other words, the U-shaped member 58 and the inverted U-shaped member 59 together function as a universal coupling.

In this construction of the outrigger jack, when the inner post 52 is moved downward, the ground plate 60 is brought into contact with the ground to support the vehicle body. In this condition, the force of the cylinder rod 57 which pushes downward acts on the pivot pin 54, the lower face plate 53 of the inner post 52, and the U-shaped member 58 and then on the ground plate 60. As understandable from this, the force of the extension cylinder 55 is transmitted to the ground plate 60 through a number of members. Thus, this outrigger jack, which has such a complicated construction, is inefficient for transmitting the force necessary for the secure support of the vehicle body.

SUMMARY OF THE INVENTION

It is an object of the present invention to provide an outrigger jack which has a simple construction for a mechanism that transmits the pushing force of the extension cylinder to the pad (ground plate) and which has a relatively high efficiency for transmitting the force.

To achieve this objective, an outrigger jack according to the present invention comprises an outer post, an inner post, an extension cylinder, and a pad. The inner post is inserted into the outer post and movable axially with respect to the outer post, and the extension cylinder is provided inside the outer and inner posts to move the inner post with respect to the outer post so as to extend or contract the outrigger jack. The pad is mounted pivotally on an axial end of the inner post through a coupling mechanism. This coupling mechanism comprises a U-shaped member, which is fixed on the end of the inner post, and an inverted U-shaped member, which is engaged with the U-shaped member and fixed on the pad. Furthermore, one end of the extension cylinder is engaged with the inner post and exposed out of the axial end of the inner post, so that the end of the extension cylinder will meet the inverted U-shaped member directly.

In this outrigger jack or extensible post, the end of the extension cylinder pushes directly the inverted U-shaped member, which is fixed on the pad. This simple construction enables the force of the extension cylinder to act directly on the pad, so it has a high efficiency for transmitting the pushing force of the hydraulic cylinder.

In this outrigger jack, the extension cylinder comprises a cylinder tube and a cylinder rod, which is inserted fittingly in the cylinder tube and transferable axially with respect to the cylinder tube. It is preferable that the cylinder tube be connected to the outer post while the cylinder rod be connected to the inner post, and that the lower end of the cylinder rod be exposed out of the axial end of the inner post, so that the end of the cylinder rod will meet the inverted U-shaped member. In addition, preferably, the end of the cylinder rod which meets the inverted U-shaped member be formed concave while the part of the inverted U-shaped member which meets this end of the cylinder rod be formed convex with the radius of curvature of the concave surface being equal to or smaller than that of the convex surface. However, these concave and convex surfaces may be provided in the relation opposite to this description.

In connecting the cylinder tube and the cylinder rod of the extension cylinder pivotally to the respective parts of the outrigger jack, it is important to arrange these parts in such a way as to avoid any bending moment which might act on the extension cylinder. In the above mentioned construction, which is relatively simple, no bending moment is created when the end of the cylinder rod meets the inverted U-shaped member. Also, it is most preferable that the part of the cylinder rod and that of the inverted U-shaped member which meet with each other be formed concave and convex, respectively. If the radius of curvature of the concave surface is made smaller than that of the convex surface, then slippage can be prevented between these contact surfaces for providing a secure support.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 2:
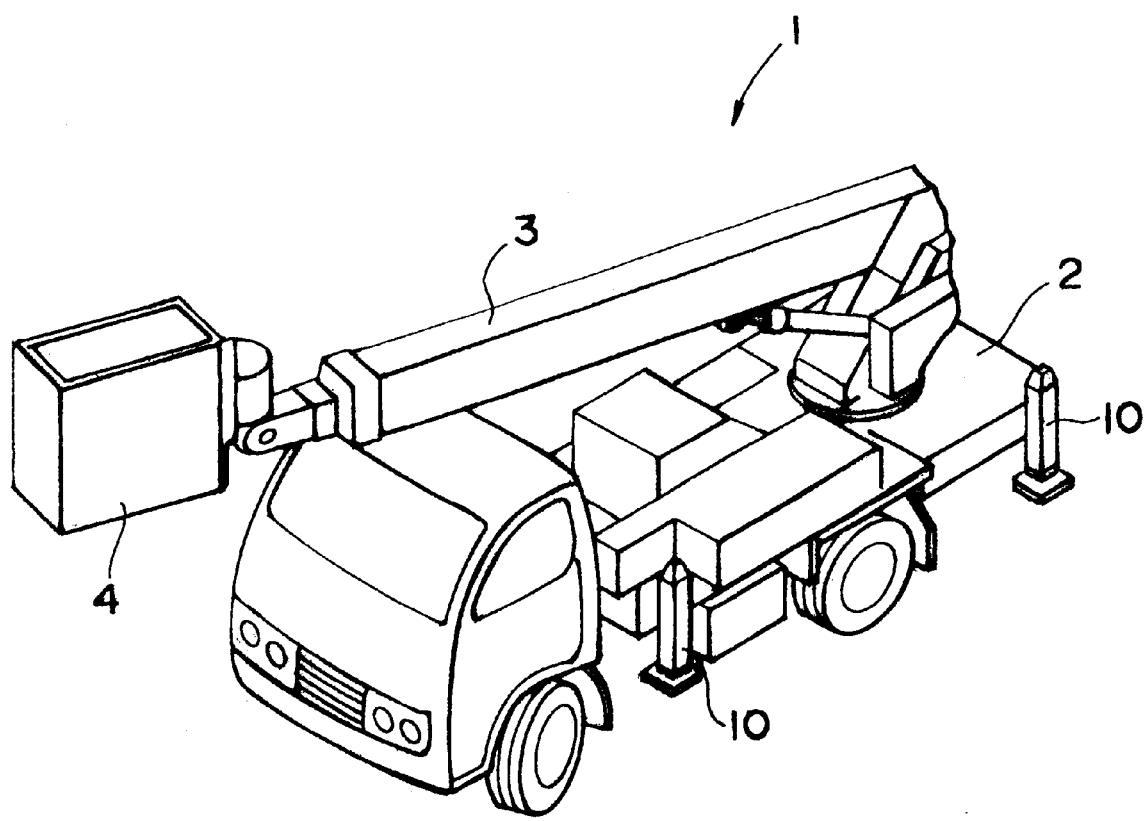
FIG. 2 is a perspective view of an aerial work platform machine which incorporates this outrigger jack.

FIG. 2 is an example of aerial work platform machine, which incorporates an outrigger jack according to the present invention. This aerial work platform machine 1 comprises a vehicle body 2, an extensible boom 3, which is mounted horizontally rotatable and vertically pivotable on the vehicle body 2, and a work platform 4 for workmen to stand on. When some work is performed with the aerial work platform machine 1, the boom 3 is rotated, raised and extended to move the work platform 4 to an aerial position where the workmen on the work platform 4 will perform some work.

In this aerial work platform machine 1, a plurality of outrigger jacks 10 are provided at front and rear and right and left four positions of the vehicle body 2 to support the vehicle body 2 securely while the work is performed. These outrigger jacks 10 are mounted on the lateral ends of outrigger beams 5, which are extensible laterally with respect to the vehicle body 2, so each of the outrigger jacks 10 can be moved laterally away from the vehicle body 2 to a desired position. While the outrigger jacks 10 are different from one another as far as the position and the orientation are concerned, these outrigger jacks are identical in construction. Therefore, one of the outrigger jacks 10 is described in detail in the following.

Figure 1:
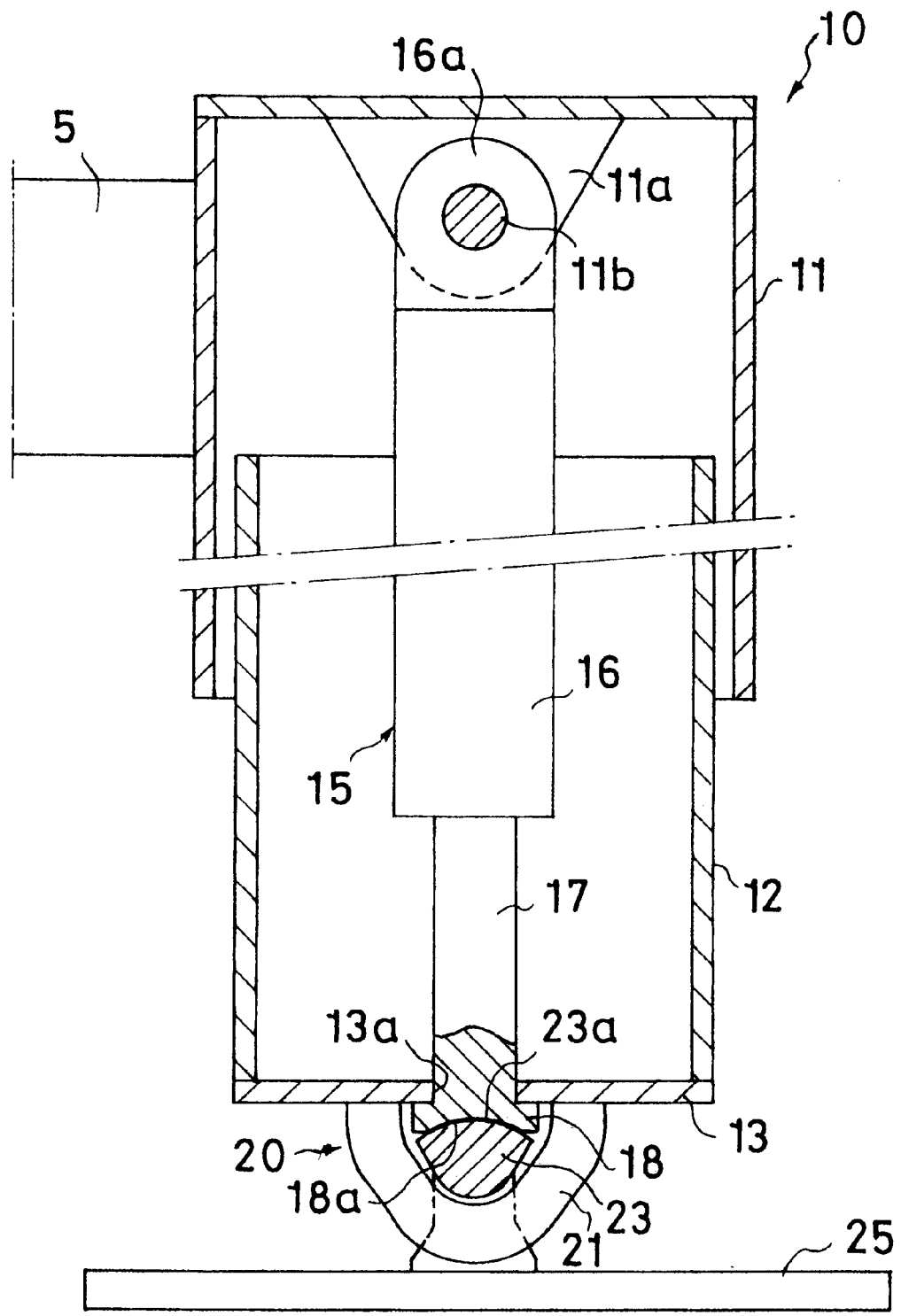
FIG. 1 is a sectional view of an outrigger jack according to the present invention.

As shown in FIG. 1, the outrigger jack 10 comprises an outer post 11, which is fixed to the outrigger beam 5, and an inner post 12, which extends vertically in the outer post 11 and is movable longitudinally. The outer post 11 is formed in a box with a rectangular cross section which is open downward while the inner post 12 is also formed in a box with a rectangular cross section which is open upward. The inner post 12 is mounted by inserting it upward into the lower opening of the outer post 11, and it is vertically movable with respect to the outer post 11. In the space defined by these outer and inner posts 11 and 12, an extension cylinder 15 is provided to move the inner post 12 vertically up and down with respect to the outer post 11.

The extension cylinder 15 is a conventional hydraulic cylinder which comprises a cylinder tube 16 and a cylinder rod 17 with a piston (not shown) provided at the upper end, and the cylinder rod is fitted in the cylinder tube 16. In this construction, the cylinder rod 17 is extend and contracted by the hydraulic pressure which is supplied into the cylinder tube 16. The upper end 16a of the cylinder tube 16 is connected pivotally with a pivot pin 11b to a support member 11a which is fixed on the inner surface of the upper end of the outer post 11. On the other hand, a flange 18 is formed at the lower end of the cylinder rod 17. This flange is positioned on the lower surface of the lower face plate 13 of the inner post 12 with the cylinder rod 17 passing through an engaging bore 13a which is provided in the lower face plate 13, such that the inner post 12 is hung by the cylinder rod 17.

A ground plate (pad) 25 is mounted pivotally through a coupling mechanism 20 onto the lower face plate 13 of the inner post 12. The coupling mechanism 20 comprises a U-shaped member 21, which is fixed on the lower surface of the lower face plate 13, and an inverted U-shaped member 23, which is fixed on the upper surface of the ground plate 25. In the coupling mechanism 20, the inverted U-shaped member 23 engages with the U-shaped member 21 by passing through a hole which is defined by the lower face plate 13 and the U-shaped member 21. As a result, the ground plate 25 is suspended pivotally through the U-shaped member 21 and the inverted U-shaped member 23 from the lower face plate 13.

Furthermore, in the coupling mechanism 20, when a contact surface 18a (hereinafter referred to as "lower contact surface") which is provided on the lower surface of the flange 18 meets a contact surface 23a (hereinafter referred to as "upper contact surface") which is provided on the upper surface of the inverted U-shaped member 23, the flange 18 is sandwiched between the inverted U-shaped member 23 and the lower face plate 13 of the inner post 12, which stays on the flange 18. As a result, the inner post 12 is fixed to the cylinder rod 17. Thus, as the cylinder rod 17 is lifted or lowered, the inner post 12 moves along with the cylinder rod 17. To realize a smooth contact between the contact surfaces 18a and 23a as well as to allow the ground plate 25 to swing freely, the lower contact surface 18a of the flange 18 is formed concave while the upper contact surface 23a of the inverted U-shaped member 23 is formed convex. Moreover, it is preferable that the radius of curvature of the concave surface be made smaller than that of the convex surface so as to prevent slippage between the contact surfaces. If slippage occurs, then it may rock the aerial work platform machine. These concave and convex surfaces may be provided in the relation opposite to the above description.

Figure 4:
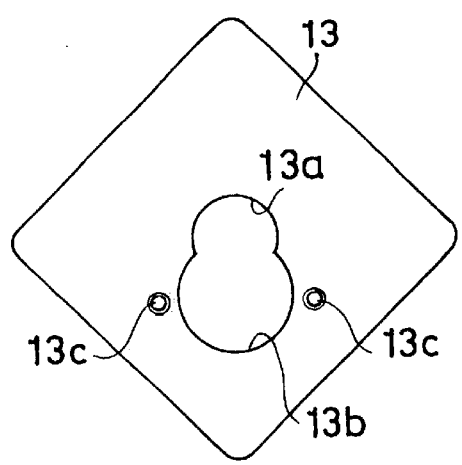
FIG. 4 is a bottom view of the lower face plate shown singularly, which plate constitutes the inner post of the jack, viewed from the bottom.

In this outrigger jack, the U-shaped member 21 and the inverted U-shaped member 23 are fixed on the lower face plate 13 of the inner post and on the ground plate 25, respectively, for example, by welding, so the cylinder rod 17 is mounted into the lower face plate 13 in the following way. As shown in FIG. 4, an engaging bore 13a, which has a diameter suitable for receiving the cylinder rod 17 fittingly (this diameter is slightly larger than that of the cylinder rod 17), is provided through the lower face plate 13 at the cross-sectional center of the inner post 12. In addition, an insertion bore 13b is provided also through the lower face plate 13, eccentrically to the cross-sectional center of the inner post, for the insertion of the flange 18 of the cylinder rod 17 into the lower face plate 13. Therefore, in assembling the outrigger jack, at first, the extension cylinder 15 is inserted into the inner post 12. Then, the flange 18 of the cylinder rod 17 is passed through the insertion bore 13b of the lower face plate 13 to a position below the lower face plate 13, and then, the cylinder rod 17 is placed into the engaging bore 13a.

Figure 3:
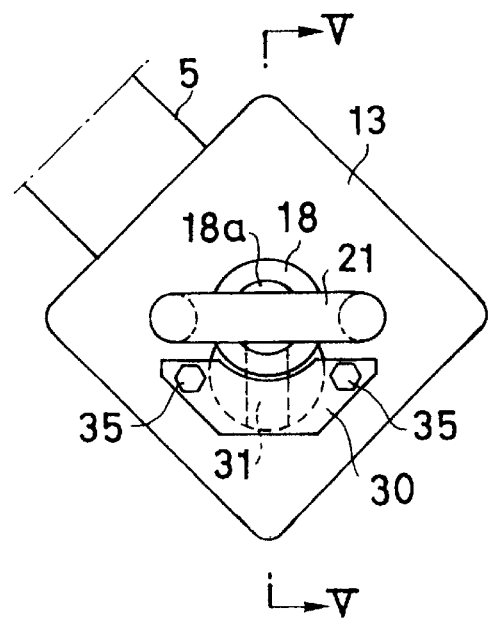
FIG. 3 is a bottom view of the jack without a ground plate, viewed from the bottom.
Figure 5:
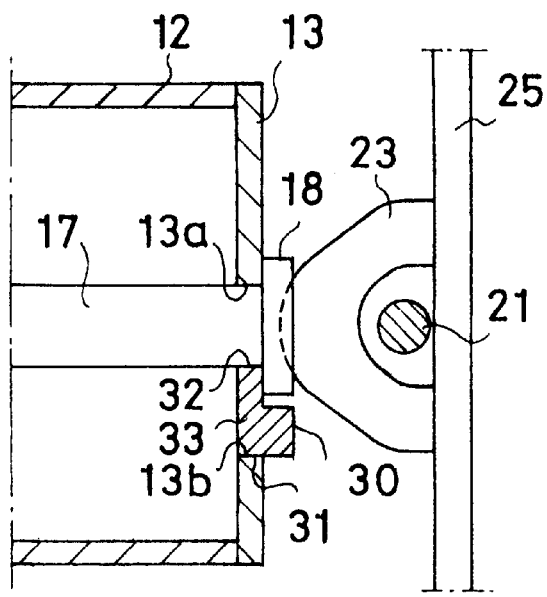
FIG. 5 is a sectional view of the jack with the ground plate, taken along line V—V in FIG. 3.

If the cylinder rod 17 is left in this condition, then it may move and return to the insertion bore 13b, and it may eventually leave the lower face plate 13. Thus, there is a possibility of the inner post 12 dropping off from the cylinder rod 17. Therefore, a retainer 30 with a portion 33 which intrudes into the insertion bore 13b (this portion is hereinafter referred to as "retaining intrusion") is bolted on the lower surface of the lower face plate 13 to retain the cylinder rod 17 in position as shown in FIG. 3 and FIG. 5. In this construction, the radially outer surface 31 of the retaining intrusion 33 meets the inner surface of the insertion bore 13b while the radially inner surface 32 meets the peripheral surface of the cylinder rod 17, so the cylinder rod 17 is firmly retained in the engaging bore 13a. In this case, if the bolts 35 used here provide a sufficient clamping force, then it is not necessary to provide the retaining intrusion 33 for the retainer 30.

In this outrigger jack 10, when the extension cylinder 15 is actuated for extension or contraction, the cylinder rod 17 is lowered or lifted together with the inner post 12. To support the vehicle body 2 with the outrigger jacks 10 as mentioned previously, the inner posts 12 of the jacks are lowered first so that the respective ground plates 25 touch the ground. Then, the extension cylinders 15 are extended further to lift the vehicle body 2 with the outrigger jacks 10. In this condition, where the vehicle body is lifted, the lower contact surface 18a of the flange 18 of the cylinder rod 17 of each jack is in direct contact with the upper contact surface 23a of the inverted U-shaped member 23, which is fixed on the ground plate 25. Therefore, the force of each extension cylinder 15 acts directly on the respective ground plate 25, so the relatively simple construction of these outrigger jacks has a high efficiency for transmitting the pushing force of the extension cylinder.

Figure 6:
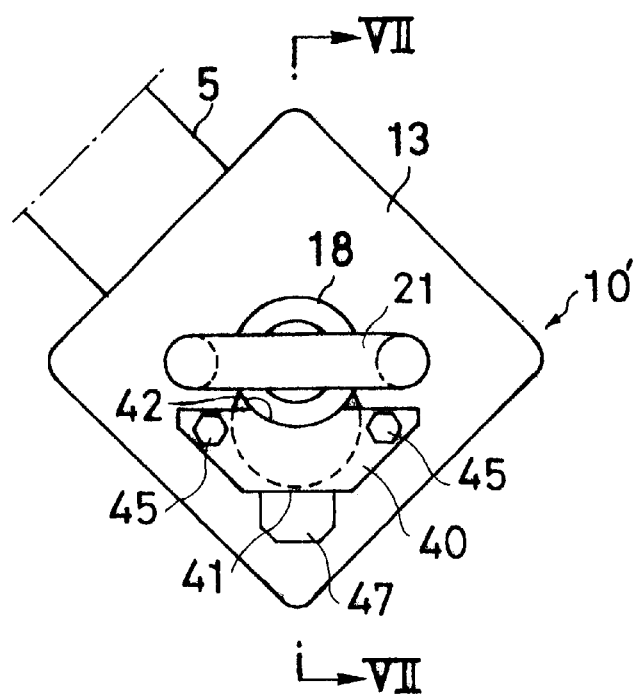
FIG. 6 is a bottom view of a second embodiment of outrigger jack according to the present invention, shown without a ground plate.
Figure 7:
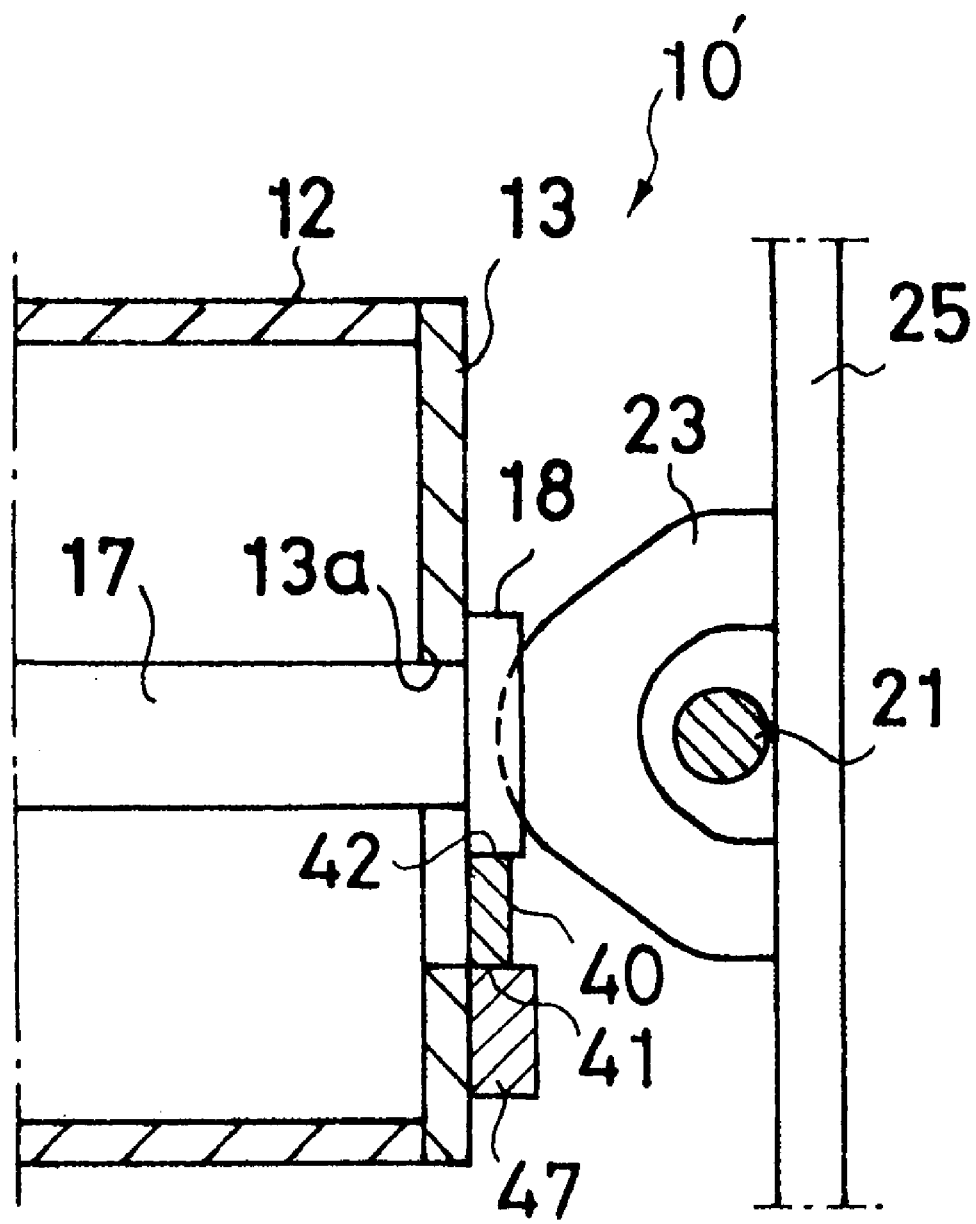
FIG. 7 is a sectional view of the second embodiment of outrigger jack with the ground plate, taken along line VII—VII in FIG. 6.
Figure 8A:
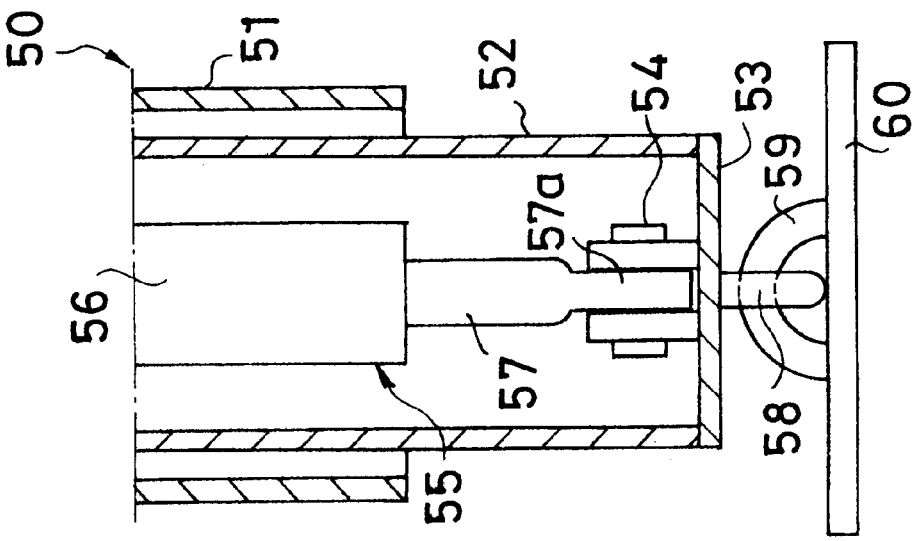
FIGS. 8A and 8B are sectional views of a prior-art outrigger jack.
Figure 8B:
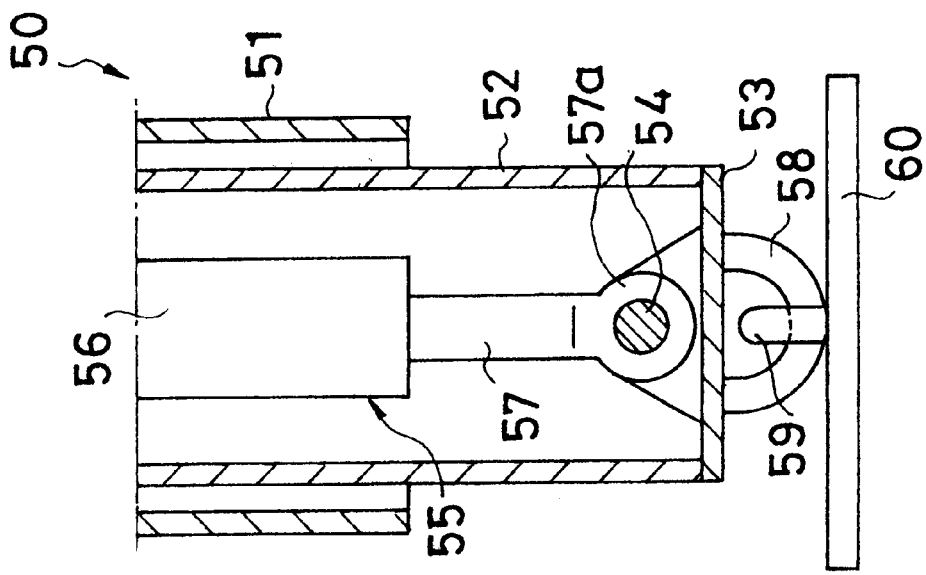

Referring next to FIGS. 6 and 7, a second embodiment of outrigger jack according to the present invention is described. This outrigger jack 10' is different from the first embodiment described above mainly in the construction of the retainer 40. Therefore, the mutually identical parts of the first and second embodiments are marked with the identical numbers in the drawings, and no description will be presented here for the identical parts.

The retainer 40 of the second embodiment is formed from a plate and fixed with bolts 45 onto the lower face plate 13 of the inner post 12. This retainer does not include any portion which can intrude into the insertion bore 13b of the lower face plate 13. However, a stopper 47 is provided on the lower surface of the lower face plate 13. This stopper 47 is fixed, for example, by welding at a position radially outward to the retainer 40. Thus, the outward surface 41 of the retainer 40 meets the stopper 47 while the inward surface 42 of the retainer 40 meets the peripheral surface of the flange 18 of the cylinder rod 17. With this retainer 40, which stays in contact with the flange 18, the cylinder rod 17 is retained firmly in the engaging bore 13a of the lower face plate 13 of the inner post 12. In this case, also, if the bolts 45 used here provide a clamping force which is sufficient to retain the cylinder rod 17 in position, then it is not necessary to provide the stopper 47 on the lower face plate 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

The application claims the priority of Japanese Patent Application No. 10-352969 filed on Dec. 11, 1998, which is incorporated herein by reference.

What is claimed is:

1. An outrigger jack comprising:

an outer post;

an inner post, which is inserted into said outer post and movable axially with respect to said outer post;

an extension cylinder, which is provided inside said outer and inner posts and which moves said inner post with respect to said outer post so as to extend or contract said outrigger jack; and a pad, which is mounted pivotally on an axial end of said inner post through a coupling mechanism;

wherein:

said coupling mechanism comprises a U-shaped member, which is fixed on said end of said inner post, and an inverted U-shaped member, which is engaged with said U-shaped member and fixed on said pad; and one end of said extension cylinder is engaged with said inner post and exposed out of said axial end of said inner post, so that said end of said extension cylinder will meet said inverted U-shaped member.

2. The outrigger jack set forth in claim 1, wherein:

said extension cylinder comprises a cylinder tube and a cylinder rod, which is inserted fittingly in said cylinder tube and transferable axially with respect to said cylinder tube;

said cylinder tube is connected to said outer post while said cylinder rod is connected to said inner post; and an end of said cylinder rod is exposed out of said axial end of said inner post and in contact with said inverted U-shaped member.

3. The outrigger jack set forth in claim 2, wherein:

the end surface of said cylinder rod which meets said inverted U-shaped member is formed concave;

a surface of said inverted U-shaped member which meets the end surface of said cylinder rod is formed convex; and a radius of curvature of said concave surface is equal to or smaller than that of said convex surface.

4. The outrigger jack set forth in claim 1, wherein:

said outer post is mounted vertically on a vehicle;

said inner post is movable to protrude downward from said outer post; and when said inner post is lowered downward by said extension cylinder, said pad is grounded so as to lift and support said vehicle.

5. The outrigger jack set forth in claim 1, wherein:

said extension cylinder is a hydraulic cylinder comprising a cylinder tube and a cylinder rod, in which cylinder, said cylinder rod is moved by hydraulic pressure supplied into said cylinder tube;

said cylinder rod includes a piston and a flange, said piston being fitted in said cylinder tube, and said flange formed at a lower end of said cylinder rod; and an upper end of said cylinder tube is connected pivotally to an upper end of said outer post while said cylinder rod is inserted in an engaging bore which is provided in a lower face plate of said inner post with said flange being positioned below said lower face plate of said inner post, such that said inner post is hung by said cylinder rod.

6. The outrigger jack set forth in claim 5, wherein:

said U-shaped member is welded on a lower surface of said lower face plate; and said inverted U-shaped member is welded on an upper surface of said pad.

7. The outrigger jack set forth in claim 5, wherein:

a rod insertion bore having a diameter to allow fitting insertion of said cylinder rod is provided through said lower face plate at a cross-sectional center of said inner post;

a flange insertion bore having a diameter to allow insertion of said flange is provided through said lower face plate eccentrically to the cross-sectional center of said inner post; and when said extension cylinder is mounted into said inner post, said flange is passed through said flange insertion bore so as to extrude out of the lower face plate of said inner post, and then said cylinder rod is shifted into and positioned in said rod insertion bore.

8. The outrigger jack set forth in claim 7, wherein:

a retainer is provided on the lower surface of said lower face plate such that said retainer intrudes into said flange insertion bore to retain said cylinder rod in said rod insertion bore.

* * * * *